US012071300B2

(12) United States Patent
Smith et al.

(10) Patent No.: US 12,071,300 B2
(45) Date of Patent: Aug. 27, 2024

(54) REFUSE PACKER SYSTEM WITH HELICAL BAND ACTUATORS

(71) Applicant: The Heil Co., Chattanooga, TN (US)

(72) Inventors: John Forrest Smith, Fort Payne, AL (US); Thomas Leon Wilding, Willard, UT (US); Rodel Caguete Magsombol, Peachtree City, GA (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/811,253

(22) Filed: Jul. 7, 2022

(65) Prior Publication Data

US 2023/0011562 A1 Jan. 12, 2023

Related U.S. Application Data

(60) Provisional application No. 63/219,682, filed on Jul. 8, 2021.

(51) Int. Cl.

*B65F 3/20* (2006.01)
*B65F 3/28* (2006.01)
*B65F 3/14* (2006.01)

(52) U.S. Cl.

CPC .............. *B65F 3/207* (2013.01); *B65F 3/201* (2013.01); *B65F 3/28* (2013.01); *B65F 2003/146* (2013.01)

(58) Field of Classification Search

CPC .. B65F 3/201; B65F 3/207; B65F 3/28; B65F 2003/146

See application file for complete search history.

(56) References Cited

U.S. PATENT DOCUMENTS 2,415,014 A * 1/1947 Luebbers .................. E02F 3/34 414/685
2,488,966 A 11/1949 Dear
3,705,656 A * 12/1972 Hunger ................. E02F 3/3636 414/723

(Continued)

FOREIGN PATENT DOCUMENTS

DE 112008003243 T5 * 10/2010 ............ B25J 9/1638
EP 2058246 A1 5/2009

(Continued)

OTHER PUBLICATIONS

International Preliminary Report on Patentability in International Appln. No. PCT/CA2018/050149, dated Aug. 20, 2020, 7 pages.

(Continued)

*Primary Examiner* — James Keenan
(74) *Attorney, Agent, or Firm* — Fish & Richardson P.C.

(57) ABSTRACT

A refuse collection vehicle includes a body having a storage compartment and a packer system. The storage compartment includes a floor. The packer system includes an ejector, two or more helical band actuators, and a driver. The helical band actuators each include a drive cylinder base, a helical band drive cylinder, and a drive cylinder receptacle coupled between the helical band drive cylinder and the ejector. The driver is commonly coupled to the helical band actuators and operable to extend and retract the helical band drive cylinders. The helical band actuators are operable to advance the ejector such that refuse is compacted in the storage compartment or ejected from the storage compartment.

18 Claims, 13 Drawing Sheets

(56) References Cited

U.S. PATENT DOCUMENTS

| | | | | |
|---|---|---|---|---|
| 3,864,260 | A | 2/1975 | Banner | |
| 4,221,527 | A | 9/1980 | Morrison | |
| 4,260,317 | A | 4/1981 | Martin et al. | |
| 4,640,659 | A | 2/1987 | Parks | |
| 4,948,323 | A | 8/1990 | Gasparini | |
| 5,857,822 | A | 1/1999 | Christenson | |
| 6,827,542 | B1 | 12/2004 | Stragier | |
| 7,563,066 | B2 | 7/2009 | Jones et al. | |
| 9,394,148 | B2 * | 7/2016 | Biondich | B66C 5/00 |
| 10,427,871 | B2 | 10/2019 | Fillion et al. | |
| 11,319,147 | B2 | 5/2022 | Maroney et al. | |
| 11,407,586 | B2 | 8/2022 | Boivin et al. | |
| 2003/0215315 | A1 | 11/2003 | Jones et al. | |
| 2012/0066920 | A1 * | 3/2012 | Stangl | G01C 9/06 33/366.11 |
| 2020/0034785 | A1 | 1/2020 | Romano et al. | |
| 2020/0247609 | A1 | 8/2020 | Maroney et al. | |
| 2020/0346861 | A1 | 11/2020 | Rocholl et al. | |
| 2020/0346862 | A1 | 11/2020 | Rocholl et al. | |
| 2021/0039880 | A1 | 2/2021 | Boivin et al. | |
| 2021/0378394 | A1 * | 12/2021 | Donovan | A46B 15/0008 |

FOREIGN PATENT DOCUMENTS

| | | | | | |
|---|---|---|---|---|---|
| KR | 20170003226 | U | * | 9/2017 | B65F 3/22 |
| KR | 200492442 | Y1 | * | 10/2020 | |
| WO | WO2019153066 | A1 | | 12/2021 | |

OTHER PUBLICATIONS

International Search Report and Written Opinion in International Appln. No. PCT/CA2018/050149, dated Oct. 29, 2018, 8 pages.

* cited by examiner

REFUSE PACKER SYSTEM WITH HELICAL BAND ACTUATORS

CROSS REFERENCE TO RELATED APPLICATION

This application claims the benefit under 35 U.S.C. § 119(e) of U.S. Patent Application No. 63/219,682, entitled "Refuse Packer System with Helical Band Actuators," filed Jul. 8, 2021, which is incorporated herein by reference in its entirety.

TECHNICAL FIELD

The invention generally relates to handling, packing and disposal of refuse.

BACKGROUND

Refuse collection vehicles ("RCVs") often include packing mechanisms for compacting and ejecting refuse material. The forces required to effectively pack the large quantities of refuse are substantial. To meet the demands of this application, ejector panels used to pack the material are often driven using telescopic hydraulic cylinders. Although hydraulic cylinders are well-suited to supply the forces needed to achieve packing, the use of hydraulic cylinders in a refuse application comes with high maintenance costs. The potential for contamination of the hydraulic fluid, for example, results in frequent maintenance intervals, vehicle down-time, and sometimes costly repairs.

Packing systems in RCVs typically use heavy, track-mounted ejector panels to collect and push refuse across the floor of a storage compartment of the vehicle. Because of track friction, manufacturing tolerances, variations in the density of the material to be packed in a given load, and other factors, the resistance encountered by the devices used to push the ejector panel can be highly unbalanced and variable. This may result in large and unpredictable torsional, bending, or other loads that can damage or impair operation of the packing devices.

SUMMARY

Implementations of the present disclosure are generally directed to systems and methods for packing refuse and ejecting refuse from an RCV. In one aspect of the disclosure, a packer system of an RCV includes helical band actuators that move an ejector to pack refuse material into a storage compartment of the RCV and eject the material from the RCV.

One aspect of the invention features a refuse collection vehicle with a body including a storage compartment and a packer system. The storage compartment includes a floor. The packer system includes an ejector, two or more helical band actuators, and a driver. The helical band actuators each include a drive cylinder base, a helical band drive cylinder, and a drive cylinder receptacle coupled between the helical band drive cylinder and the ejector. The driver is commonly coupled to the helical band actuators and operable to extend and retract the helical band drive cylinders. The helical band actuators are operable to advance the ejector such that refuse is compacted in the storage compartment or ejected from the storage compartment.

In some implementations, the storage compartment includes one or more guide tracks. The ejector is coupled to at least one of the one or more guide tracks. The helical band actuators are operable to advance the ejector on at least one of the one or more guide tracks.

In some implementations, the drive cylinder bases of the helical band actuators and the driver are coupled to a common base.

In some implementations, the driver includes an electric motor.

In some implementations, the driver includes a hydraulic motor.

In some implementations, the driver includes a chain drive.

In some implementations, at least one of the drive cylinder receptacles includes an end plate of a helical band actuator.

In some implementations, the packer system includes a base plate. The base plate supports the driver and the drive cylinder bases of the helical band actuators. The base plate can pivot with respect to the body.

In some implementations, the base plate pivots with respect to the body.

In some implementations, the refuse collection vehicle includes a control system that controls a speed of at least two of the helical band actuators.

In some implementations, the refuse collection vehicle includes one or more sensors coupled to the control system. The sensor(s) sense a load of the ejector on the helical band actuators.

In some implementations, the refuse collection vehicle includes one or more sensors coupled to the control system. The control system determines an angle of the helical band drive cylinders relative to one or more components of the packer system.

In some implementations, the refuse collection vehicle includes one or more cross members coupled between the drive cylinder receptacles of the helical band actuators.

In some implementations, the refuse collection vehicle includes one or more cross members coupled between the drive cylinder receptacles of the helical band actuators. The cross member(s) maintain a spacing between the drive cylinder receptacles.

In some implementations, the cross member(s) maintain a squareness of the helical band actuators with respect to a common base.

In some implementations, the helical band actuators retract the ejector from the storage compartment Another aspect of the invention features a refuse collection vehicle with a body including a storage compartment and a packer system. The packer system has an ejector, two or more helical band actuators, and one or more drivers. The helical band actuators each include a drive cylinder base, a helical band drive cylinder, and a drive cylinder receptacle coupled between the helical band drive cylinder and the ejector. The one or more drivers are operable to extend and retract the helical band drive cylinders. A cross member is coupled between the drive cylinder receptacles of the helical band actuators. The cross member maintains a spacing between the drive cylinders of the helical band actuators. The helical band actuators are operable to advance the ejector on guide tracks such that refuse is compacted in the storage compartment or ejected from the storage compartment. The cross member and the drive cylinder receptacles allow transverse movement relative to the ejector during ejection and compaction.

In some implementations, the cross member maintains a squareness of the helical band actuators with respect to a common base.

In some implementations, the drive cylinder receptacles are allowed to move transversely relative to the ejector as the ejector moves on the one or more guide tracks of the storage compartment during ejection and compaction.

In some implementations, a resilient pad is coupled between each of the end plates and the ejector. The resilient pad allows transverse movement and/or angular misalignment between the end plates and the ejector.

In some implementations, the packer system includes a control system and one or more packer sensors coupled to the control system. The control system can receive information from the packer sensors and to control the helical band actuators. In some implementations, a driver for each of the helical band actuators is separately controlled (e.g., to allow for adjustment of the force applied by each of the helical band actuators).

In some implementations, the packer system maintains a squareness of the helical band actuators with respect to a common base during unbalanced loading of the ejector.

In some implementations, the drive cylinder receptacles slide transversely relative to the ejector as the ejector moves on the one or more guide tracks of the storage compartment during ejection and compaction.

In some implementations, the drive cylinder receptacle includes an end plate of a helical band actuator.

In some implementations, the refuse collection vehicle includes a resilient pad coupled between each of the end plates and the ejector, wherein the resilient pad allows transverse movement between the end plates and the ejector.

In some implementations, the refuse collection vehicle includes a resilient pad coupled between each of the end plates and the ejector, wherein the resilient pads allow angular misalignment between the end plates and the ejector.

In some implementations, the packer system further includes a control system and one or more sensors coupled to the control system, wherein the control system receives information from the sensors and to control the two or more helical band actuators to maintain a squareness of the helical band actuators relative to a common frame.

In some implementations, the helical band actuators are coupled to a common driver.

In some implementations, the helical band actuators are retracts the ejector from the storage compartment.

Another aspect of the invention features a method of compacting or ejecting refuse from a storage compartment includes: coupling two or more helical band actuators to a common driver; coupling the two or more helical band actuators to an ejector; and operating the common driver to advance the ejector in the storage compartment to compact refuse in the storage compartment or eject refuse from the storage compartment.

In some implementations, the method includes cross-coupling helical band drive cylinders of at least two of the two or more helical band actuators to maintain a spacing between the helical band drive cylinders.

In some implementations, the method includes controlling a squareness of at least two of the drive cylinders of the helical band actuators relative to the driver frame during compaction or ejection.

In some implementations, controlling a squareness of the at least two of the drive cylinders includes sensing one or more characteristic(s) of the ejector or the helical band actuators; and controlling the helical band actuator(s) based on at least one of the sensed characteristic(s).

Another aspect of the invention features a method of compacting or ejecting refuse from a storage compartment that includes cross-coupling the drive cylinders of two or more helical band actuators; and driving the two or more helical band actuators to advance an ejector in the storage compartment to compact refuse in the storage compartment or eject refuse from the storage compartment.

In some implementations, the method includes coupling a cylinder receptacle of each of the drive cylinders to the ejector such that the cylinder receptacles are allowed to move transversely relative to the ejector during compaction or ejection.

In some implementations, the method includes controlling a squareness of at least two of the drive cylinders of the helical band actuators relative to the driver frame during compaction or ejection.

Another aspect of the invention features a refuse collection vehicle with a body including a storage compartment and a packer system. The storage compartment includes a floor and one or more guide tracks. The packer system includes an ejector, one or more helical band actuators coupled to the ejector, and a motor coupled to the helical band actuator(s). The ejector is movably coupled to the one or more guide tracks. Each of at least one of the helical band actuators a drive cylinder base, a helical band drive cylinder coupled to the drive cylinder base; and a drive cylinder receptacle coupled to the helical band drive cylinder. The motor is coupled to the one or more helical band actuator(s) and operable to extend and retract the helical band drive cylinder of the helical band actuator(s). The helical band actuator(s) are operable to advance the ejector on the one or more guide tracks such that refuse is compacted in the storage compartment or ejected from the storage compartment.

Another aspect of the invention features a refuse collection vehicle with a body including a storage compartment and a packer system. The storage compartment includes a floor and one or more guide tracks. The packer system includes an ejector, one or more helical band actuators coupled to the ejector, one or more drivers coupled to the helical band actuator(s), and a control system coupled to the driver(s). The ejector is movably coupled to the guide track(s). Each of at least one of the helical band actuators a drive cylinder base, a helical band drive cylinder coupled to the drive cylinder base; and a drive cylinder receptacle coupled to the helical band drive cylinder. The driver(s) are operable to extend and retract the helical band drive cylinders. The control system is operable to control the helical band actuators to advance the ejector on the one or more guide tracks such that refuse is compacted in the storage compartment or ejected from the storage compartment.

In some implementations, the refuse collection vehicle includes one or more packer sensors and the drivers includes two or more electric motors. One of the electric motors is coupled to each of the helical band actuators. The control system controls a speed of each of the electric motors during packing based on information from the packer sensors.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers in different figures indicate similar elements.

DETAILED DESCRIPTION

Implementations of the present disclosure are directed to systems, devices, and methods for collecting, packing, transporting, and disposing of refuse. Some implementations include an RCV with a packing system that includes helical band actuators to compact refuse and eject the refuse from the RCV.

Implementations may be employed with respect to any suitable type of RCV, with any suitable type of body and/or hopper variants. For example, the RCV may be an automated side loader vehicle. As another example, the RCV can be a commercial front loader (e.g., for dumpster type containers). As another example, the RCV can be a residential front loader. A front loader can be provided with or without an intermediate collection device. The intermediate collection device can be used, for example, to collect residential-sized containers. As another example, the RCV can be a rear loader, with cameras and/or other sensors embedded in an acrylic strip or other suitable component (e.g., across the floor of the rear hopper). As another example, an RCV can be a truck with an automated side loader ("ASL").

Figure 1:
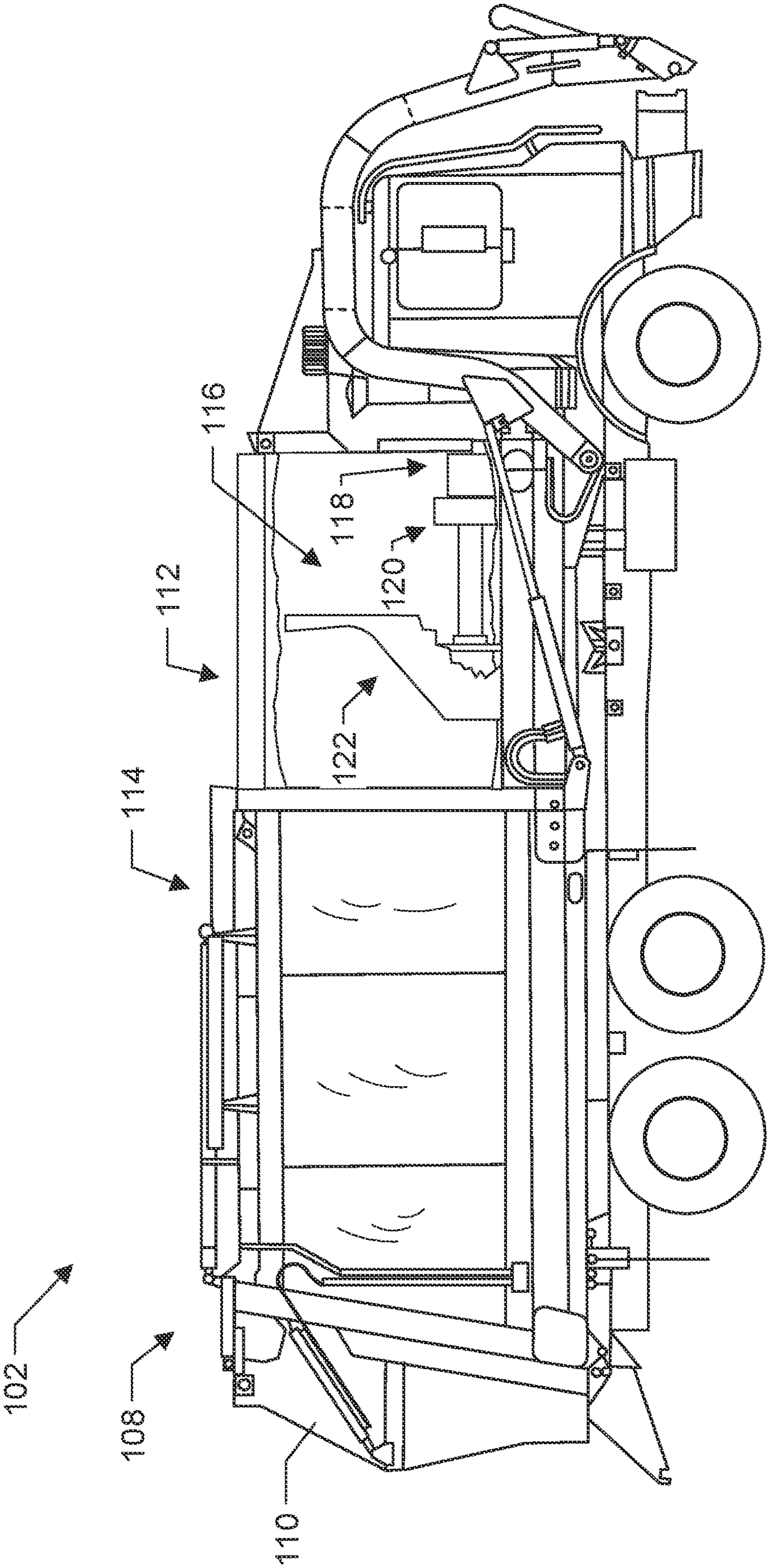
FIG. 1 depicts an example of a refuse collection vehicle including a packer system, according to implementations of the present disclosure.
Figure 2:
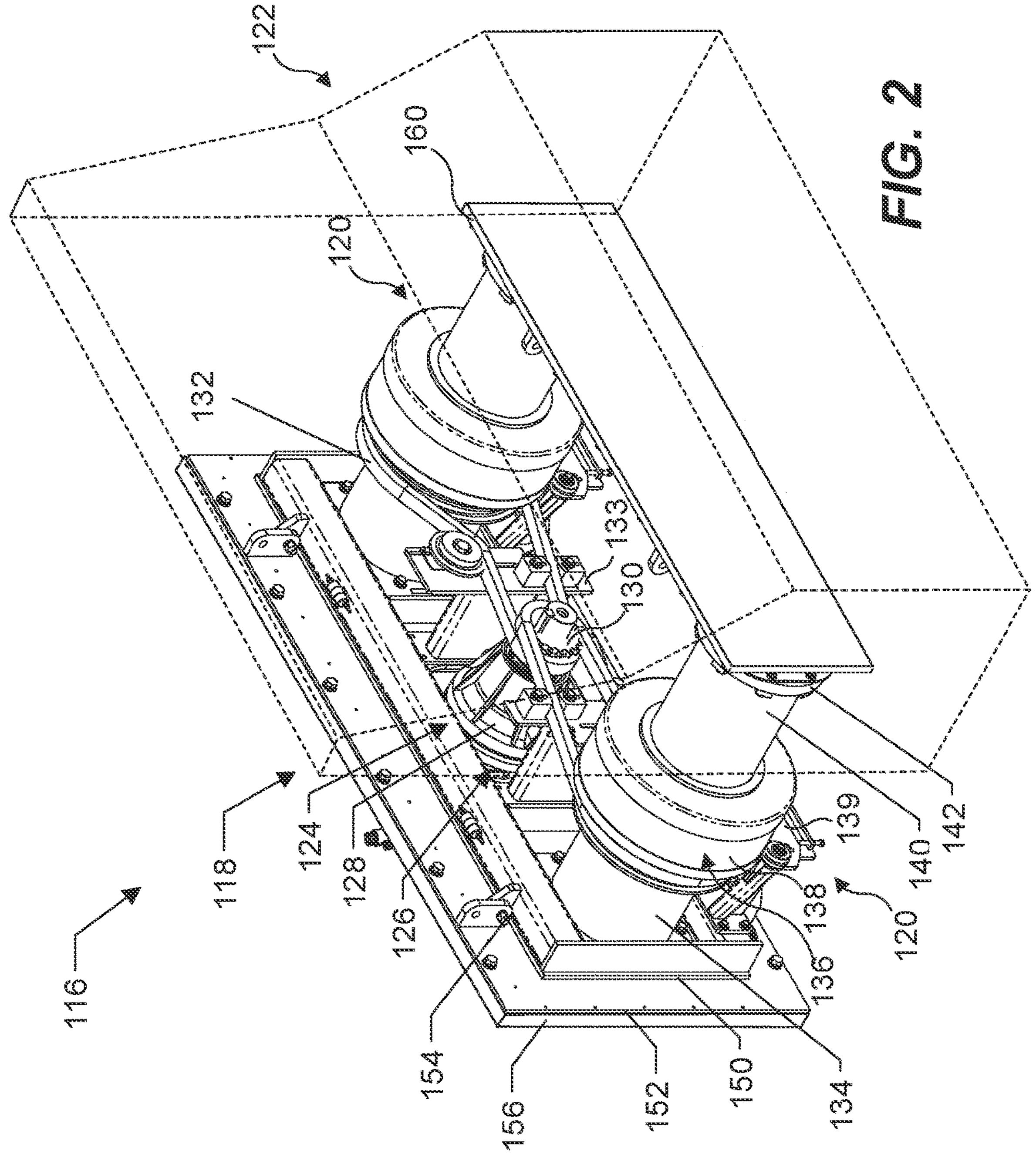
FIG. 2 is a perspective view of a packer system, according to implementations of the present disclosure.

FIG. 1 depicts an example of a front-loading refuse collection vehicle including a packer system. Vehicle 102 includes a body 108, a tailgate 110, a hopper compartment 112, a storage compartment 114, and a packer system 116. In FIG. 2, a sidewall of hopper compartment 112 is shown as cut away to reveal components of packer system 116. Each of storage compartment hopper compartment 112 and storage compartment 114 includes a floor (not shown in FIG. 1). Packer system 116 includes a drive system 118, helical band actuators 120, and an ejector 122.

Packer system 116 may compact or eject material in storage compartment 112, depending on whether tailgate 110 of vehicle 102 is open or closed. If tailgate 110 is closed, the material in storage compartment 114 is held, such that operation of the packer system 116 packs the material in storage compartment 114. If tailgate 110 is open, refuse material may be ejected from storage compartment 114.

Vehicle 102 can be an RCV that operates to collect and transport refuse (e.g., garbage). The refuse collection vehicle can also be described as a garbage collection vehicle, or garbage truck. Vehicle 102 can be configured to lift containers that contain refuse, and empty the refuse in the containers into a hopper of vehicle 102 and/or intermediate collection device conveyed by the RCV, to enable transport of the refuse to a collection site, compacting of the refuse, and/or other refuse handling activities. Vehicle 102 can also handle containers in other ways, such as by transporting the containers to another site for emptying.

In some implementations, vehicle 102 is an all-electric vehicle. Motive power and various body controls and subsystems on the vehicle (including packing and ejector systems) can be electrically powered.

FIG. 2 is a perspective view of a packer system 116. In FIG. 2, ejector 122 is shown with dashed lines so that the details of helical band actuators 120 and drive system 118 can be more easily seen. Drive system 118 is coupled to helical band actuators 120. The ends of helical band actuators 120 opposite drive system 118 are each coupled to ejector 122. As further described below, drive system 118 may be operated to extend and retract the ends of the drive cylinders of helical band actuators 120 to slide ejector 122 forward and back in hopper compartment 112 and storage compartment 114.

Drive system 118 includes a drive unit 124. Drive unit 124 includes a motor 126, a reducer 128, and a sprocket 130. Sprocket 130 is installed on an output shaft of reducer 128. Motor 126 is coupled to a control system (not shown in FIG. 2). Drive system 118 is coupled to each of helical band actuators 120 by way of drive chains 132. Drive system 118 includes a chain tensioning system 133 on each drive chains 132. In some implementations, motor 126 is an electric motor. In certain implementations, motor 126 is a hydraulic motor.

In one implementation, the powertrain motor and packer system 116 are both electrically powered. In some implementations, the powertrain motor and packer system receive power from a common electrical energy storage system (e.g., a common battery pack). In other implementations, packer system 116 receives power from a different electrical energy storage system than the powertrain motor.

In the implementation illustrated in FIG. 2, helical band actuators 120 are arranged horizontally in the hopper compartment. Each of helical band actuators 120 includes a base 134, a helical band drive 136, a magazine 138, a magazine support 139, a drive cylinder 140, and an end plate 142. In one example, each of helical band actuators 120 can apply a compression force up to 30,000 pounds.

Drive cylinder 140 is formed from the combination of a toothed flat band and a perforated cylindrical band. A supply portion of the toothed flat band is coiled on or in base 134. A supply portion of the perforated cylindrical band is held in magazine 138. As helical band drive 136 is rotated, drive cylinder 140 is formed as the bands are progressively released and interconnect with one another to form a load-bearing cylinder. When drive cylinders 140 are to be extended, helical band drives 136 are turned in one direction to elongate drive cylinders 140. When drive cylinders 140 are to be retracted, helical band drives 136 are turned in the opposite direction to shorten drive cylinders 140.

Bases 134 and magazine supports 139 of helical band actuators 120 are mounted on a pivot base plate 150. Drive unit 124 and chain tensioning systems 133 are also mounted on pivot base plate 150. Pivot base plate 150 is pivotally coupled to a fixed base plate 152 at pivot joints 154. Fixed base plate 152 is mounted on a support frame member 156 of vehicle 102 near the front of hopper compartment 112. Support frame member 156 can in turn be coupled (directly or indirectly) to body 108 of vehicle 102, the frame of vehicle 102, or a combination of both. As is further described herein, in some implementations, a base for a drive system is installed on structural components that are reinforced to handle loads encountered during packing operations (e.g., frame assembly 190 described below relative to FIG. 10). As can be seen in FIG. 2, the left and right helical band actuators 120 are commonly coupled to drive system 118. Thus, operation of the two helical band actuators 120 can be synchronized. The force applied to the ejector may be equally balanced between the two helical band actuators. As further described below, ejector 122 is coupled to end plates 142 of helical band actuators 120 by way of top plate 160. (In the context of top plate 160, "top" refers to the location at the ends of helical band actuators opposite the base of the actuators, and does not imply being on an upper side of the packer system.)

Figure 3:
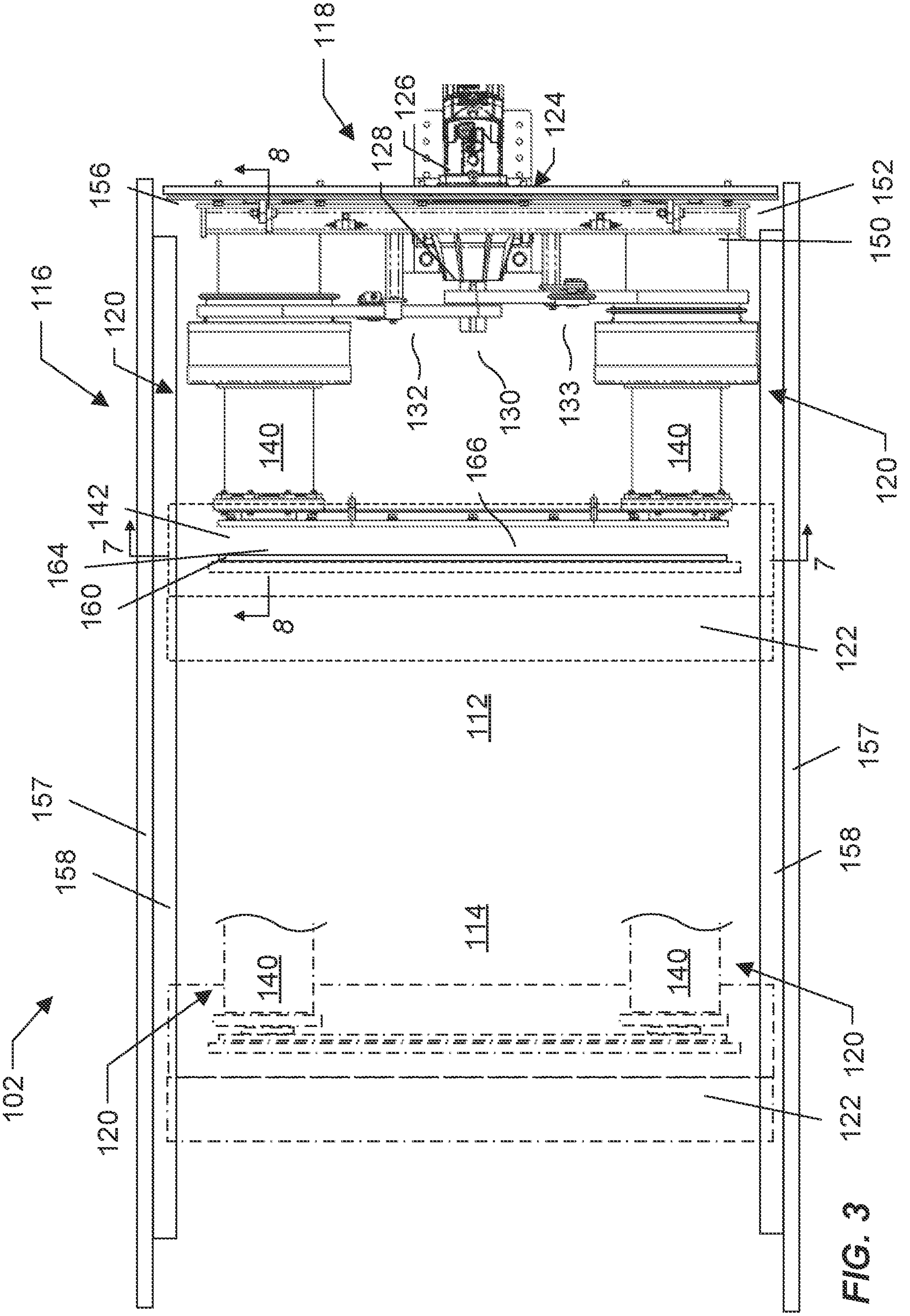
FIG. 3 is a top view of a packer system, according to implementations of the present disclosure.

FIG. 3 is a top view of packer system 116 of vehicle 102. When the drive cylinders 140 of helical band actuators 120 are extended, ejector 122 is driven toward the rear of vehicle 102 between the opposing side walls 157 of hopper compartment 112 and storage compartment 114, thereby compacting or ejecting the refuse in storage compartment 114. (For illustrative purposes, the ejector and the end of the helical band actuators are shown as phantom lines in an extended condition of the helical band actuators). Conversely, when the drive cylinders 140 of helical band actuators 120 are retracted, ejector 122 is pulled forward in vehicle 102 to return ejector 122 to a retracted position in hopper compartment 112 (as shown, for example, on the right side of FIG. 3).

Drive unit 124 of drive system 118 is mounted on pivot base plate 150. Motor 126 generally extends from pivot base plate 150 toward the front of vehicle 102. Reducer 128 extends from pivot base plate 150 toward the rear of vehicle 102. Drive chains 132 are engaged on sprocket 130. Each of drive chains 132 passes through one of chain tensioning systems 133. Pivot base plate 150 is coupled to fixed base plate 152, which is in turn coupled to support frame member 156.

In some cases, ejector 122 includes notches or slots for engaging tracks 158. Engagement on tracks 158 may maintain the base of ejector 122 in line and at floor level as ejector 122 is advanced toward the rear of vehicle 102 and refuse is compacted or ejected from vehicle 102.

In some implementations, an ejector is coupled to helical band actuators such that the ejector can float transversely relative the drive cylinders of the helical band actuators. The end plates of the actuators can be cross coupled to one another. As used in this context, "transversely" means in a direction perpendicular to the central axis of the drive cylinder. Thus, in a horizontally mounted helical band actuator, transversely may include up, down, left, right, or any other direction within a plane perpendicular to the axis of drive cylinder 140. In this context, "float" between related parts does not indicate that there is no resistance to movement in the direction of float, or that there an unlimited range of motion in the direction of float. "Float" does indicate that the related parts are allowed some amount of motion in the direction of the float.

Top plate 160 is coupled to an end plate 142 of each of helical band actuators 120. Pads 164 are provided between top plate 160 and each of end plates 142. Pads 164 may be made of a resilient material. In one example, pads are made of neoprene synthetic rubber. Top plate 160 and end plates 142 may be coupled by one or more bolts (not shown in FIG. 3). The size and material of pads can be selected to accommodate misalignment and/or inclination between the ejector and the end of the helical band actuators. In certain implementations, pads 164 can slide transversely with respect to one or more of top plate 160 and the pad's respective end plate 142. In one example, pads 164 include an oversized bore through which a load bolt passes, with the clearance between the sides of the bore and the shaft of the load bolt passing through actuator that allows the pad to shift laterally relative to the load bolt.

End plates 142 are coupled to one another by way of a cross member 166. In one example, cross member 166 is a steel plate. Cross member 166 may maintain a constant spacing between end plates 142 of the left and right helical band actuators 120. In cooperation with other components (including a floating connection between the end plates and the ejector), cross member 166 may maintain a desired degree of squareness of drive cylinders 140 with other components of the packer system and/or the storage compartment. As used herein, "squareness" refers to a perpendicular relationship between a plane or axis of one component and that of one or more other components. For example, the central axes of drive cylinders may be held to a desired degree of perpendicularity relative to base plate pivot base plate 150 on which helical band drives 120 are mounted and/or the planar front surface of cross member 166. In some implementations, the axes of rotation of drive cylinders 140 are maintained in a parallel relationship with one another and a parallel relationship to the floor of hopper compartment 112 within a desired degree. Maintaining squareness between the drive cylinder axes and other components may reduce stresses (e.g., bending stresses) on helical band actuators due to non-axial loads on the drive cylinders. Such non-axial loads may be caused, for example, by debris encountered on the ejector tracks during compaction or ejection, misalignment due to manufacturing tolerances in the ejector, tracks, or other components, or variations in the density, weight, or other physical characteristics of material being packed across the surface of the ejector.

Figure 4:
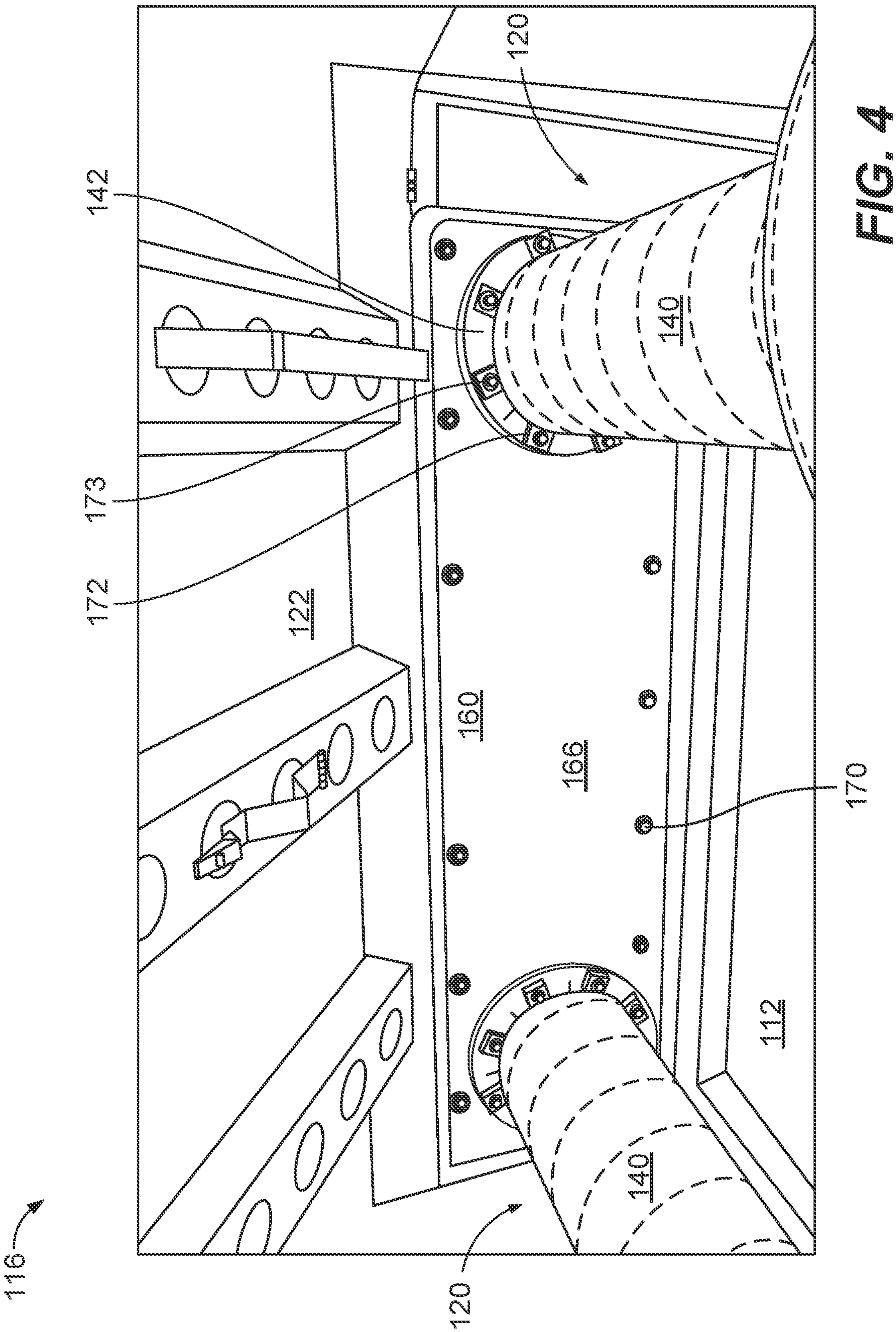
FIG. 4 is a perspective view of packer system looking toward the ejector from the driver-side of the packer system, according to implementations of the presented disclosure.

FIG. 4 is a perspective view of packer system 116 looking toward the ejector from the cab-end of vehicle 102. Top plate 160 is bolted to ejector 122 by way of bolts 170. Each of drive cylinders 140 of helical band actuators 120 is coupled to a respective end plate 142 by way of a toothed ring 172, which is bolted to the end plate around its circumference by way of bolts 173. Cross member 166 is attached to both of end plates 142. Each end plate 142, in combination with toothed ring 172, may serve as a receptacle for one of drive cylinders 140.

Figure 5:
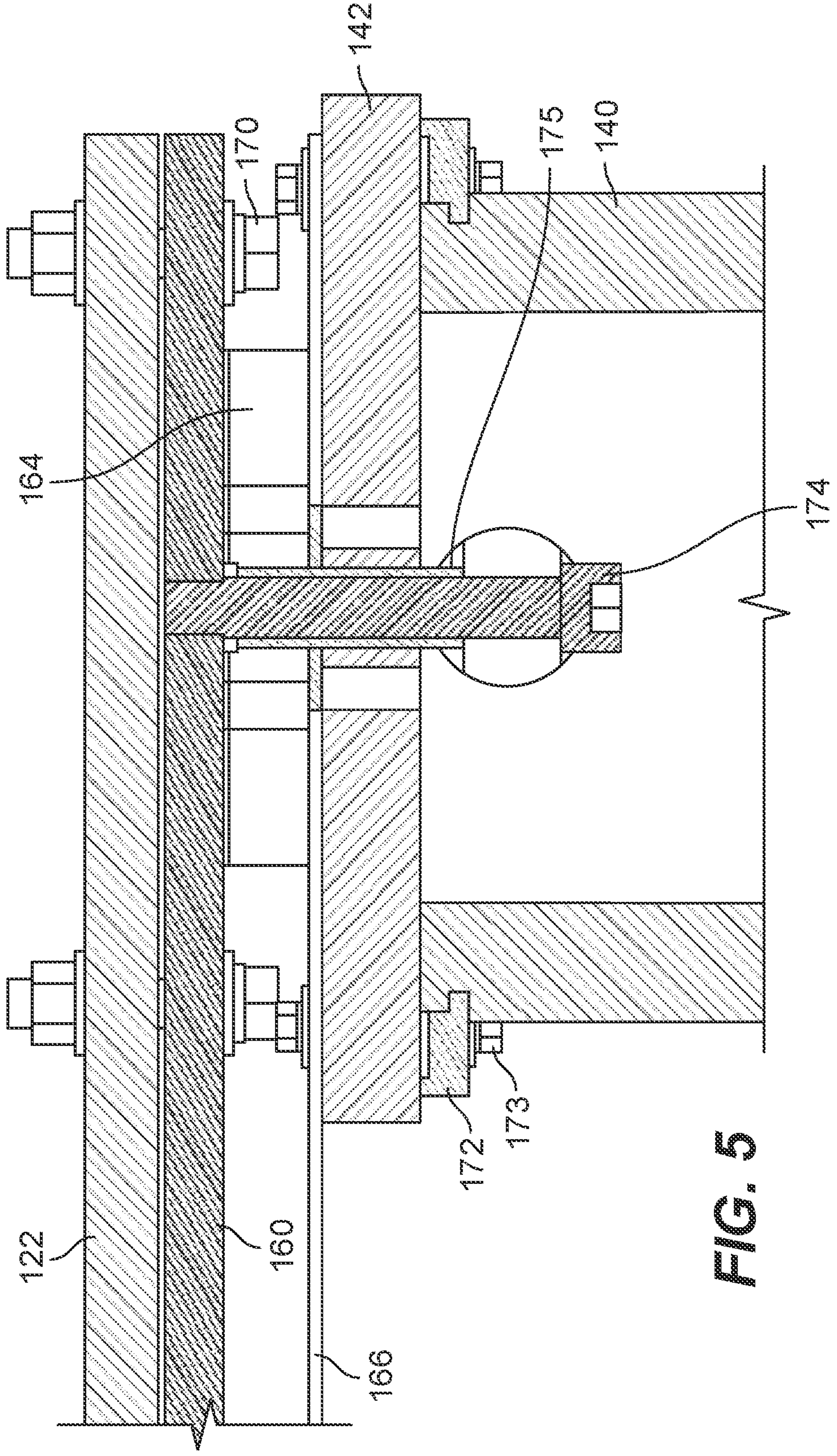
FIG. 5 depicts an example of a connection between the end plate of a helical band actuator and an ejector.

FIG. 5 depicts an example of a connection between the end plate of the helical band actuator and the ejector. Drive cylinder 140 is coupled to end plate 142. Toothed ring 172 is bolted to end plate 142 around its circumference by way of bolts 173. Pad 164 is disposed between top plate 160 and cross member 166 (which is bolted to end plate 142). Top plate 160 is coupled to ejector 122 by way of bolts 170. In this example, top plate 160 may float with respect to cross member 166. Bolt 174 and sleeve 175 pass through end plate 142 and pad 164. In one implementation, a total range of 1.5 inches of lateral movement is allowed on the floating plate (e.g., ¾ inch in each direction from theoretical center.) Any inclination in any direction may be taken by pad 164.

In some implementations, cross member 166 acts as a floating plate. During installation, cross member 166 can be held and the alignment adjusted using bolts 173. Cross member 166 may ensure that clearances (e.g., side-to-side and up and down) are maintained within acceptable limits. Cross member 166 may also ensure that alignment of helical band actuators 120 is maintained within acceptable limits.

Figure 6:
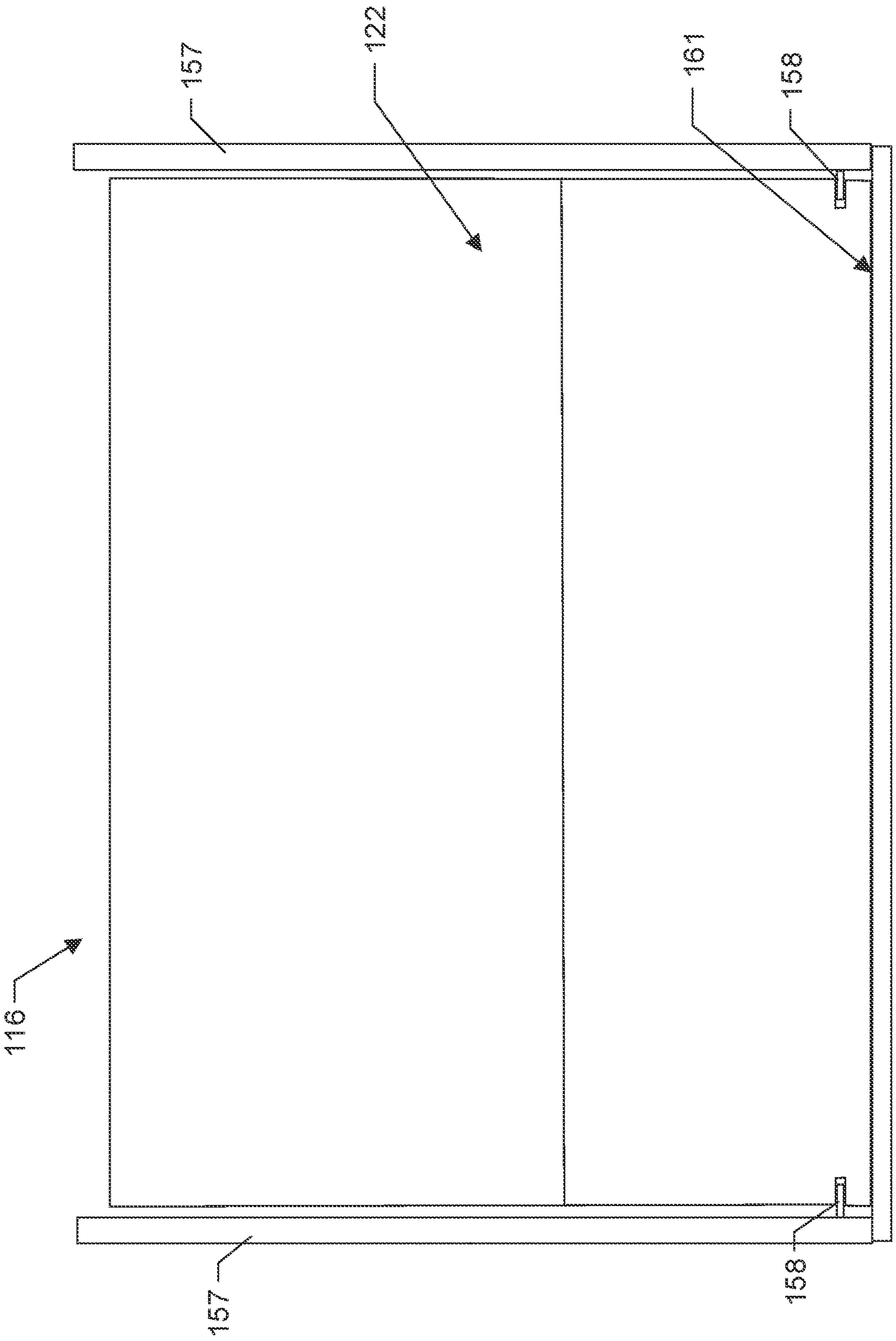
FIG. 6 depicts a packer system viewed from the rear of a vehicle, according to implementations of the presented disclosure.

FIG. 6 illustrates packer system 116 viewed from the rear of a vehicle. Ejector 122 can include channels that engage on tracks 158 along walls 157. During packing, engagement of ejector 122 on tracks 158 may inhibit ejector 122 from lifting up off of floor 161 in response to resistance from the refuse being packed.

Figure 7:
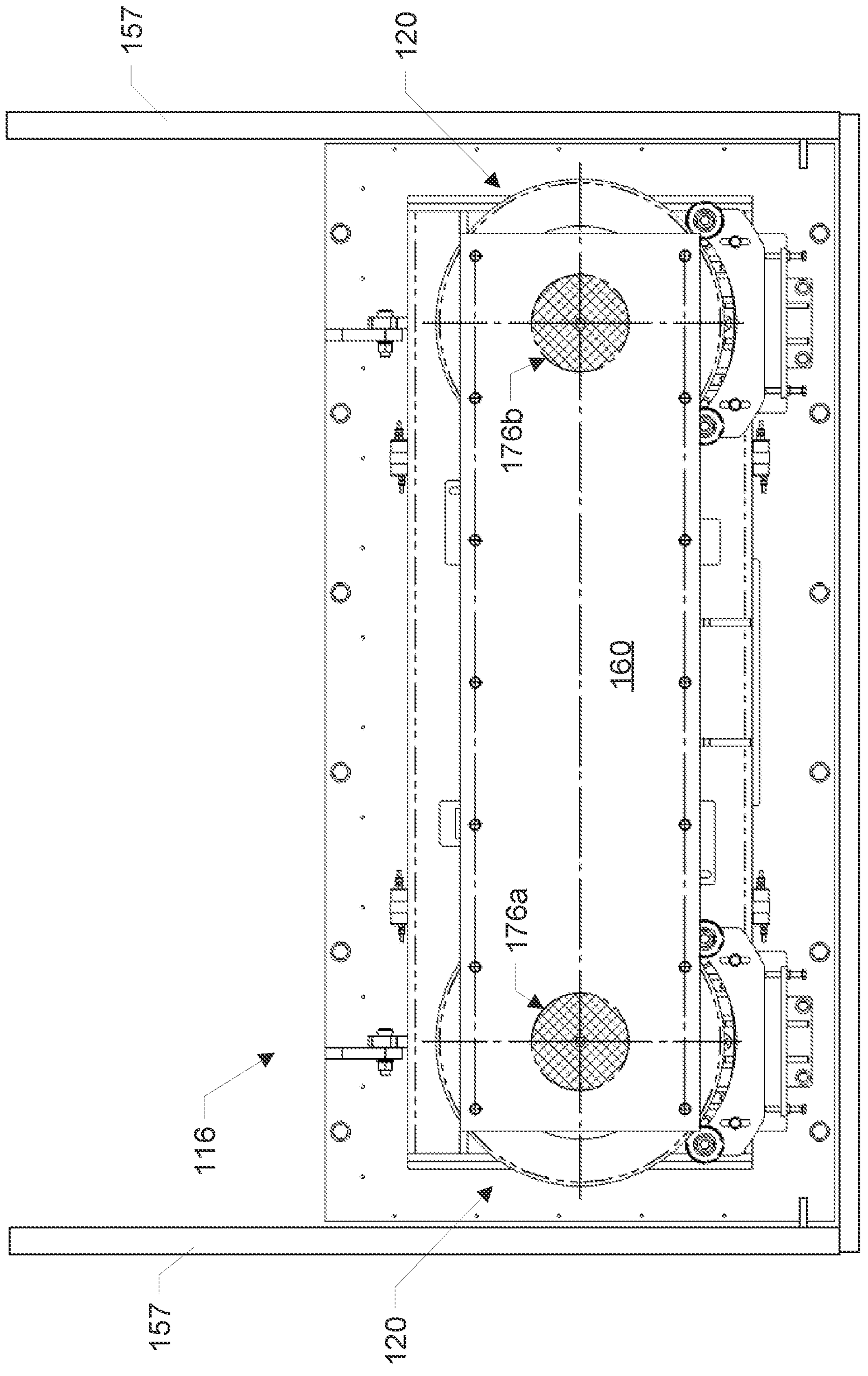
FIG. 7 is a cross-sectional view of the packer system taken along lines 7-7 of FIG. 3.

FIG. 7 illustrates the components of a packer system 116 on the driver-side of vehicle 102. Packer system 116 is installed between opposing walls 157 of vehicle 102. Top plate 160 is coupled to helical band actuators 120 bolted to ejector 122 (not pictured for illustrative purposes). In some implementations, compression force is applied to the ejector at defined zones. For example, in the system shown in FIG. 7, one half of the total compression force may be applied in zone **176*a* and the other half of the compression force may be applied in zone 176*b***.

Figure 8:
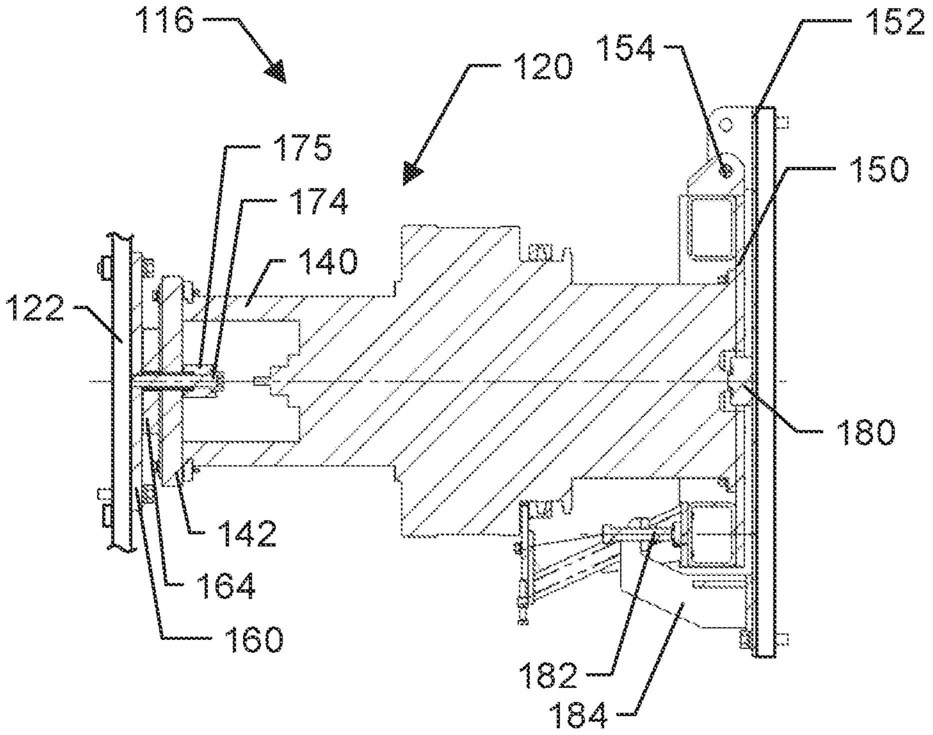
FIG. 8 is a cross-sectional view of the packer system taken along lines 8-8 of FIG. 3.

FIG. 8 illustrates a cross sectional view of the packer system taken 116 along lines 8-8 of FIG. 3. The cross hatching in FIG. 8 is for illustrative purposes only. Helical bands 140 can be received in receptacles 142. Pivot base plate 150 can pivot with respect to fixed base plate 152 at pivot joints 154. A compression load cell 180 is included between each one of helical band actuators 120 and fixed base plate 152. Each of compression load cells 180 may measure compression force on one of the helical band actuators 120. A traction load cell 182 is included between each one of brackets 184 and pivot base plate 150. Each of traction load cells 182 can measure traction force on one of the helical band actuators.

Drive cylinders 140 of helical band actuators can be received in receptacles 142. Pad 164 is disposed between top plate 160 and cross member 166 (which is bolted to end plate 142). In this example, top plate 160 may float with respect to cross member 166. Bolt 174 and sleeve 175 pass through end plate 142 and pad 164. Ejector 122 is bolted to top plate 160.

In some implementations, compression load cells 180 measure compression force as the ejector is advanced. In some implementations, traction load cells 182 measure traction force as the ejector is retracted. In certain implementations, measured compression force and/or traction is used to control one or more of the helical band actuators. For example, if compression force during packing exceeds a predetermined threshold, the speed of the motor may be decreased.

Packer system 116 may include other sensors. For example, packer system 116 can include additional load sensors, position sensors, angle sensors, or pressure sensors. In some cases, angle sensors, position sensors, or both, are used to monitor angles between components the packer system relative to one another or to other component of vehicle 102. In certain implementations, operation of the packer system can be controlled based on the information provided by the sensors.

Control of packer system 116 may be carried out manually, automatically, or a combination thereof. In some implementations, a control system collects data from packer system sensors and/or other operational sensors and controls the packer system or other components of vehicle based on the information. For example, a control system may automatically shut down or reduce the speed of a drive system if a compression load, angle between a helical band drive, or another measured characteristic of the packer system is outside an established range or exceeds an established threshold.

Figure 9:
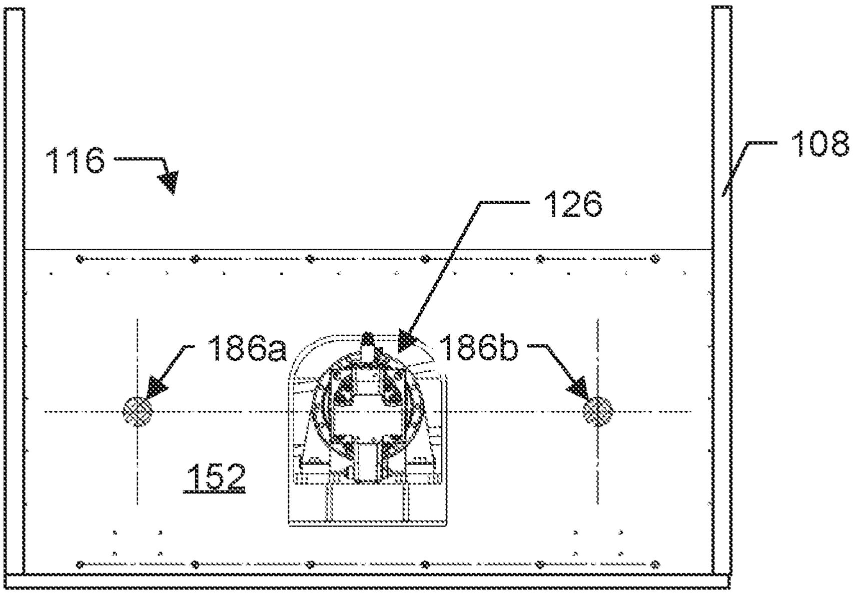
FIG. 9 depicts a packer system viewed from the front a vehicle.

FIG. 9 illustrates a packer system 116 viewed from the front a vehicle. As further described relative to FIG. 10, fixed base plate 152 can be coupled to body 108 of vehicle 102 by way of a frame assembly. Compression force may be applied to the base plate on the cab-end at defined zones. In this case, one half of the total compression force of the packer system may be applied in zone **186*a* and the other half of the total compression force of the packer system may be applied in zone 186*b***.

Figure 10:
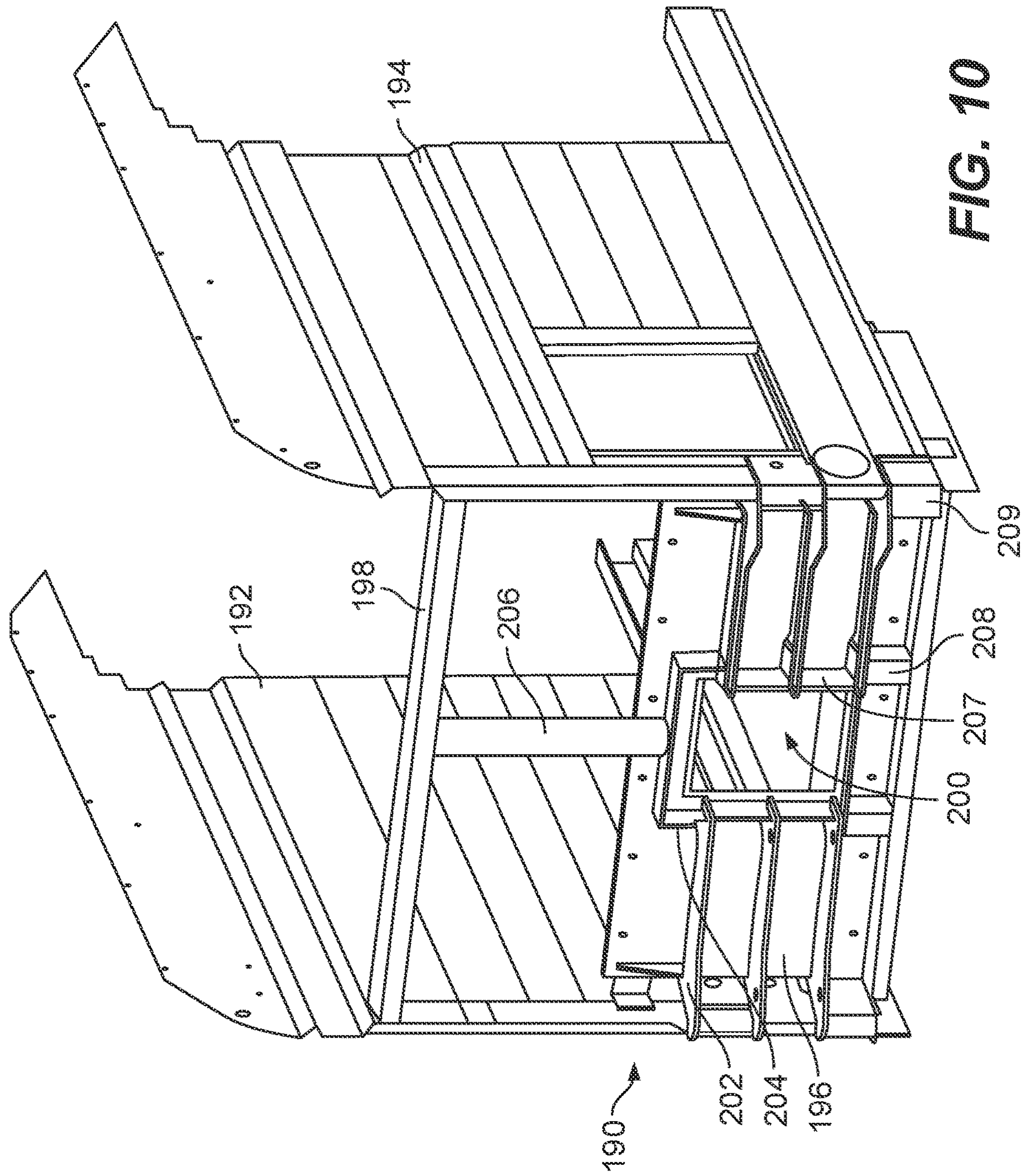
FIG. 10 depicts an example of a frame assembly on which a fixed base plate of the packer system can be installed.

In some implementations, vehicle 102 includes a frame assembly on which the drive system for the helical band actuator system can be installed. FIG. 10 illustrates an example of a frame assembly on which the fixed base plate 152 of packer system 116 (shown in FIG. 3) can be installed. Frame assembly 190 is mounted between opposing side walls 192 and 194 of body 108 of vehicle 102.

Frame assembly 190 includes main plate 196 and cross member 198. The opposing ends of main plate 196 and cross member 198 can each be coupled to one of side walls 192 and 194 of body 108.

Structural members of the base of a packer system (e.g., fixed base plate 152 of packer system 116) can be installed on main plate 196. In some implementations, a base plate is bolted to a frame assembly. In one example, fixed base plate 152 is bolted to main plate 196 using upper and lower rows of bolts in the pattern shown in FIG. 9.

Main plate 196 includes opening 200. Opening 200 may receive drive unit 124 (not pictured in FIG. 10 for clarity). Main plate 196 is reinforced by ribs 202 and box gusset 204. Main vertical support member 206 is coupled between box gusset 204 and cross member 198. Middle vertical support members 207 and base vertical support members 208 are included on main plate 196 between adjacent pairs (higher and lower) of ribs 202. Side vertical support members 209 are included at the side edges of main plate 196 between adjacent pairs (higher and lower) of ribs 202. In one implementation, cross member 198, main vertical support member 206 and base vertical support members 208 are tubular members (e.g., having a rectangular tubular cross-section). Frame assembly 190 provides support to fixed base plate 152 and the components of packer system 116 mounted to fixed base plate 152.

Figure 11:
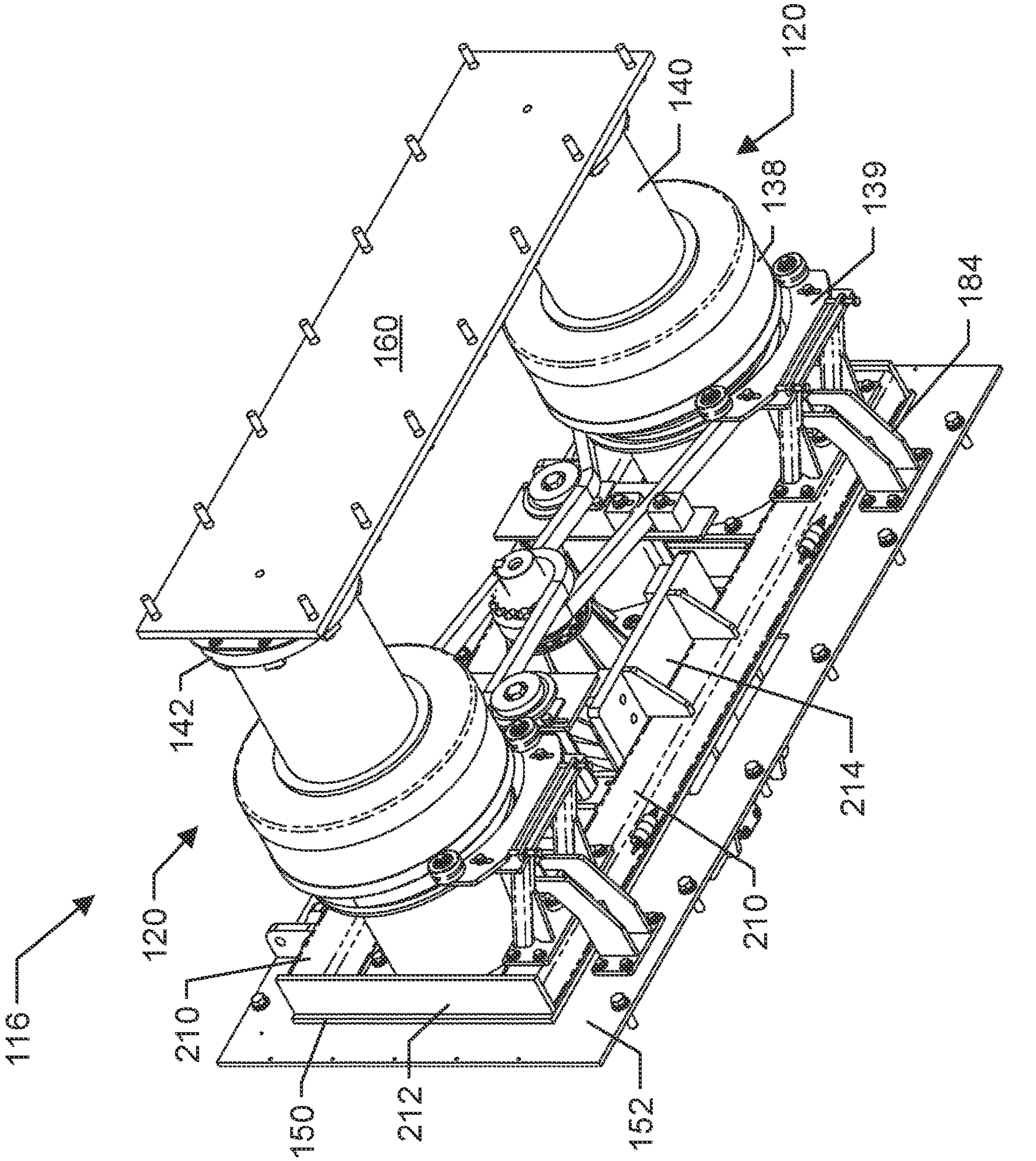
FIG. 11 depicts a packer system from below.

FIG. 11 illustrates the packer system 116 from below. Helical band actuators 120 are commonly coupled to pivot base 150. A magazine 138 of each helical band actuators 120 is supported on one of magazine supports 139. Brackets 184 are mounted to fixed base plate 152 between supporting members of magazine supports 139. Pivot base plate 150 includes upper and lower cross members 210 and vertical ribs 212. Vertical ribs 212 may be joined to upper and lower cross members 210 (for example, by welding). A drive unit support platform 214 is attached to the lower one of cross members 210. Cross members 210 and vertical ribs 212 may help keep pivot base plate 150 flat during packing operations, which may help maintain the drive ends of helical band actuators 120 in a co-planar relationship with one another and the drive cylinders parallel to one another.

In some implementations, a drive system and helical band actuators are installed into the body of an RCV as a preassembled unit. For example, a sub-assembly of the base plates, drive system, helical band actuators, and top plate, such as shown in FIG. 11, can be pre-assembled outside of vehicle 102. The sub-assembly can be lowered into position in hopper compartment 112 of vehicle 102 and attached to frame assembly 190. In some cases, before attaching ejector 122 to the actuators, end plates 142 of helical band actuators 120 are aligned such that the end plates are coplanar. In some cases, bolts 173 and toothed rings 172 (shown in FIG. 5) are used to adjust the alignment of end plates 142.

In the examples described above with respect to FIGS. 1 through 11, the packer system ejector is advanced into and withdrawn from the storage compartment of the vehicle with the helical band actuators. In other implementations, the ejector of a packer system may be moved by other types of actuators. Examples of other types of linear motion devices that can be used include belt drive actuators, ball screw actuators, lead screw actuators, rack-and-pinion devices, and hydraulic actuators.

In the examples described above with respect to FIGS. 1 through 11, a packer system includes two helical band actuators. In other implementations, a packer system can include three or more helical band actuators. In one example, a packer system includes four helical band actuators arranged to form the corners of a square or rectangle. In certain implementations, a packer system includes a single helical band actuator.

Figure 12:
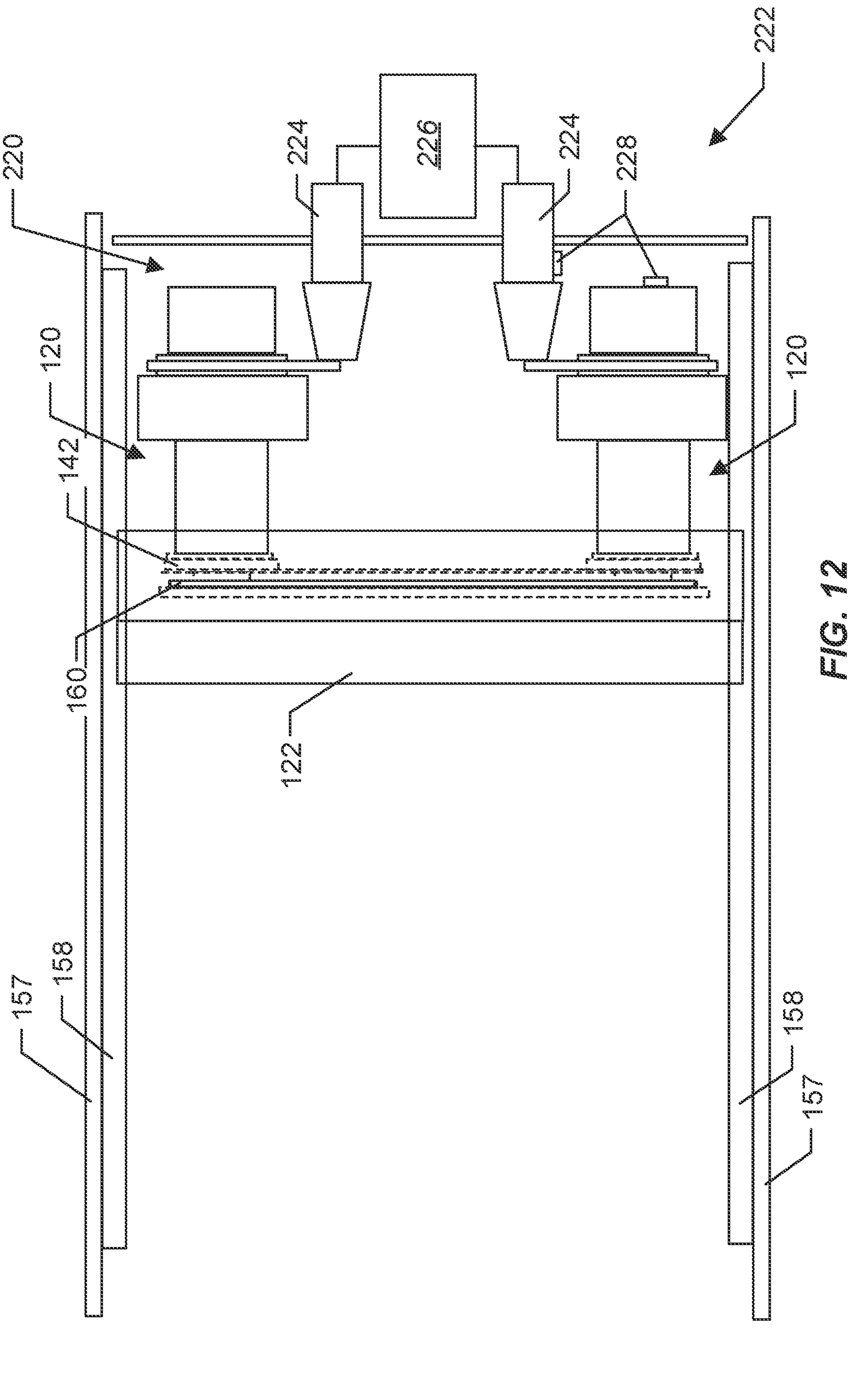
FIG. 12 depicts an example of a packer system including separately driven helical band actuators, according to implementations of the present disclosure.

In examples described above with respect to FIGS. 1 through 11, the helical band actuators are commonly driven by a single drive unit. In other implementations, each of two or more helical band actuators is driven by a separate drive unit. FIG. 12 shows an example of a packer system including separately driven helical band actuators. A packer system 220 includes helical band actuators 120, drive system 222, and ejector 122. Drive system 222 includes drive units 224 and control system 226. One of drive units 224 is coupled to each of helical band actuators 120. In one example, each of drive units 224 includes an electric motor.

Packer sensors 228 can be included on components of packer system 220, including helical band actuators 120, ejector 122, and drive units 224. Control system 226 may be coupled to each of drive units 224 and to packer sensors 228. In some implementations, control system 226 adjusts the drive units to achieve the desired forces on ejector 122 and/or maintain alignment of the components of the packer system. For example, power to one of drive units 224 may be increased to account for a greater resistance to packing by the material on that side of the storage compartment. In one example, control system 226 is as described below relative to FIG. 13.

In some implementations, vehicle 102 includes one or more cameras. Cameras can be used, for example, to detect or monitor the position or state of refuse in the vehicle, the position or state of vehicle sub-systems or their components, or other characteristics. As used herein, a "camera" includes any device that can be used to capture an image. Images can include still images and video images. A camera can include one or more image sensors. A camera can also include other types of sensors (e.g., audio sensors, heat sensors). Cameras and/or sensor devices can include, but are not limited to, one or more of the following: visible spectrum cameras, thermal (IR) cameras, temperature sensors, pressure sensors, IR sensors, UV sensors, ultrasonic (ultrasound) sensors, Doppler-based sensors, time-of-flight (TOF) sensors, color sensors (e.g., for determining, RGB data, XYZ data, etc., with or without IR channel blocking), microwave radiation sensors, x-ray radiation sensors, radar, laser-based sensors, LIDAR-based sensors, thermal-based sensors, spectral cameras (e.g., including hyper- and/or ultra-spectral imaging technology that use spectral fingerprints to classify very small objects at high speeds), and so forth.

Figure 13:
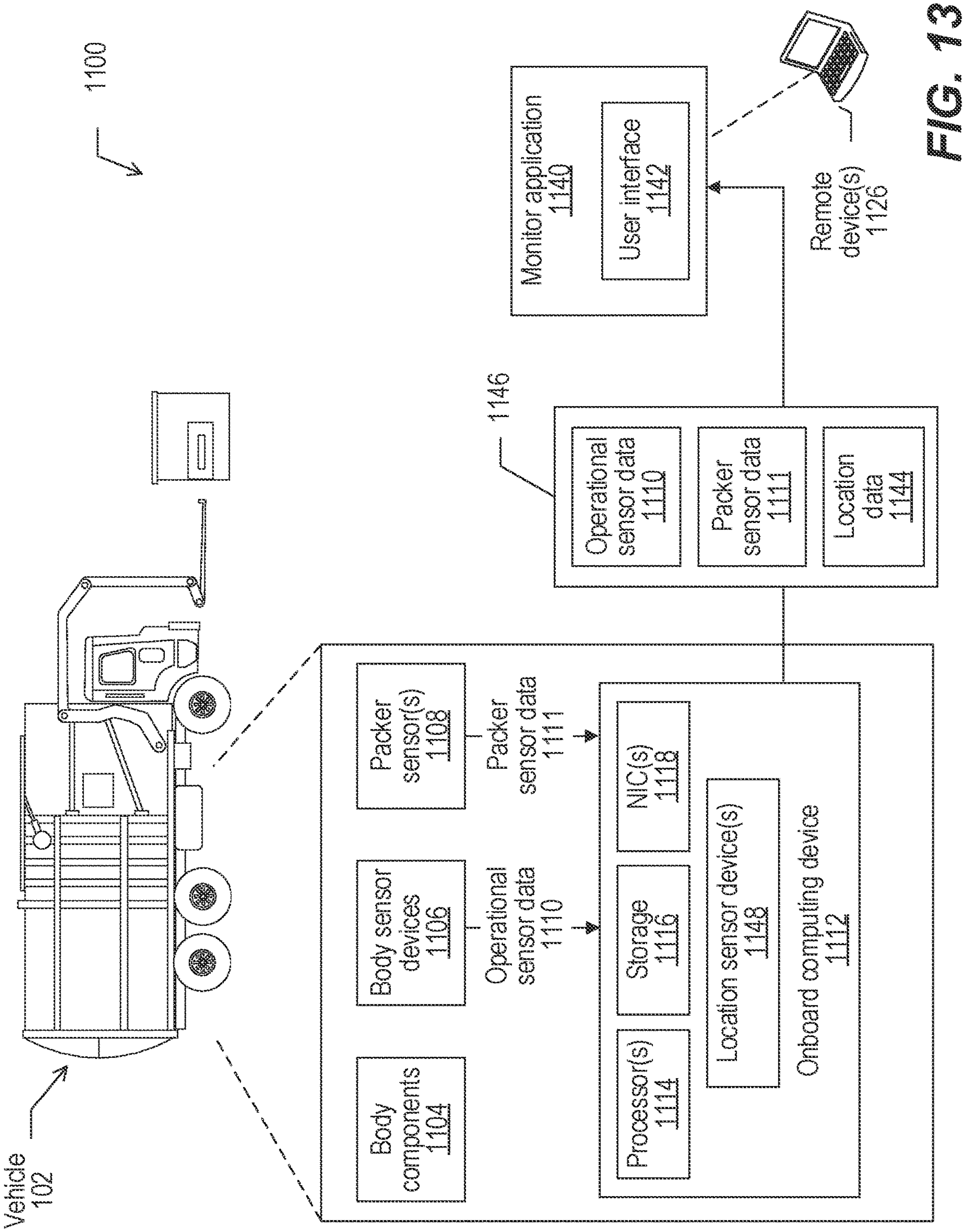
FIG. 13 depicts an example of a control system for a vehicle including a packer system, according to implementations of the present disclosure.

FIG. 13 illustrates a control system for a vehicle including a packer system, according to implementations of the present disclosure. Control system 1100 can include any number of packer sensors 1108 that sense loads, position, angle, or other characteristics of the packer system or its components. The packer sensors may provide data during compaction, ejection, when the system is idle or shut down, or any other mode of operation. In some cases, sensors are used to obtain data about the operation of the drive system. Information from the sensors can be used to control motion of the ejector. For example, speed or acceleration of an ejector may be controlled based on loads encountered during packing, ejecting, or retracting.

Vehicle 102 can also include any number of body sensor devices 1106 that sense body component(s), and generate operational sensor data 1110 describing the operation(s) and/or the operational state of various body components 1104. The body sensor devices 1106 are also referred to as operational sensor devices, or operational sensors. Operational sensors may be arranged in the body components, or in proximity to the body components, to monitor the operations of the body components. The operational sensors may emit signals that include the operational sensor data 1110 describing the body component operations, and the signals may vary appropriately based on the particular body component being monitored. In some implementations, the operational sensor data 1110 is analyzed, by a computing device on the vehicle and/or by remote computing device(s), to identify the presence of a triggering condition based at least partly on the operational state of one or more body components, as described further below.

In some implementations, the operational sensor data and packer sensor data may be communicated from the body sensors and packer sensors, respectively, to an onboard computing device 1112 in the vehicle 102. In some instances, the onboard computing device is an under-dash device (UDU), and may also be referred to as the Gateway. Alternatively, the device 1112 may be placed in some other suitable location in or on the vehicle. The sensor data and/or image data may be communicated from the sensors and/or camera, to the onboard computing device 1112, over a wired connection (e.g., an internal bus) and/or over a wireless connection. In some implementations, a J1939 bus connects the various sensors and/or cameras with the onboard computing device. In some implementations, the sensors and/or cameras may be incorporated into the various body components. Alternatively, the sensors and/or cameras may be separate from the body components. In some implementations, the sensors and/or cameras digitize the signals that communicate the sensor data and/or image data, before sending the signals to the onboard computing device, if the signals are not already in a digital format.

The onboard computing device 1112 can include one or more processors 1114 that provide computing capacity, data storage 1116 of any suitable size and format, and network interface controller(s) 1118 that facilitate communication of the device 1112 with other device(s) over one or more wired or wireless networks.

In some implementations, the analysis of the operational sensor data 1110 and/or packer sensor data 1111 is performed at least partly by the onboard computing device 1112, e.g., by processes that execute on the processor(s) 1114. For example, the onboard computing device 1112 may execute processes that perform an analysis of the sensor data 1110 to detect the presence of a triggering condition, such as blockage in the hopper compartment or storage compartment. On detecting the triggering condition, the device 1112 can transmit one or more signals 1146 to a remote computing device, such as remote device(s) 1126. In some implementations, onboard computing device 1112 operates as an edge device.

In the example of FIG. 13, the signal(s) 1146 (possibly including operational sensor data 1110, packer sensor data 1111, location data 1144, and/or other information) are sent to the remote device(s) 1126, and image(s) are presented in a user interface 1142 of a monitor application 1140 executing on the remote device(s) 1126. In some implementations, the operational sensor data 1110, packer sensor data 1111, location data 1144, and/or other information is analyzed on the device 1112 to identify triggering conditions. Location data 1144 can include global positioning system ("GPS") data and/or sensor-based location data (e.g., proximity sensors or in-cylinder position sensors). A large amount of sensor data and image data can be generated by the sensors and cameras respectively, and received by the onboard computing device 1112. In some implementations, a suitable data compression technique is employed to compress the sensor data, image data, location data, and/or other information before it is communicated in the signal(s), over network(s), to the remote device(s) 1126 for further analysis. In some implementations, the compression is lossless, and no filtering is performed on the data that is generated and communicated to the onboard computing device and then communicated to the remote device(s). Accordingly, such implementations avoid the risk of losing possibly relevant data through filtering.

Sensors can be provided on the vehicle body to evaluate cycles and/or other parameters of various body components. For example, the sensors can measure the hydraulic pressure of various hydraulic components, and/or pneumatic pressure of pneumatic components. The sensors can also detect and/or measure the particular position and/or operational state of body components such as the top door of a refuse vehicle, an intermediate collection device attached to a refuse vehicle, a lift arm, a refuse packing mechanism, a tailgate, and so forth, to detect events such as a lift arm cycle, a pack cycle, a tailgate open or close event, an eject event, tailgate locking event, and/or other body component operations.

In some implementations, the onboard computing device is a multi-purpose hardware platform. The device can include a UDU (Gateway) and/or a window unit (WU) (e.g., a device with camera(s), sensors, and/or any computing device) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2C lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2C lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

In some implementations, the onboard computing device 1112 (e.g., UDU) collects operational sensor data 1110 on an ongoing basis and/or periodically (e.g., every second, every 5 seconds, etc.), and the data is analyzed to determine whether a triggering condition is present. In some implementations, the determination of a triggering condition can be further based on the location and/or movement of the vehicle. For example, a triggering condition can be determined based on the vehicle moving at less than a threshold speed (or decelerating to below a threshold speed) prior to the operational sensor data indicating a particular operational state of body components, and/or when the vehicle is within a threshold distance (e.g., within 10-15 feet) of a known location of a container to be handled. One or more images can be retrieved that visualize the refuse after the container is emptied into the hopper or intermediate collection device (e.g., at a time that is determined based on the operational sensor data). Velocity, acceleration (or deceleration), and/or location of the vehicle can be based at least partly on information received from the vehicle's onboard systems, such as a GPS receiver and/or telematics sensor(s) describing the current speed, orientation, and/or location of the vehicle at one or more times.

In some implementations, the data to be uploaded to the remote device(s) 1126 can be packaged, in the signal(s) 1146, into bundles of (e.g., telemetry) data every 5-10 minutes. This bundle of data can be compressed and/or encrypted, and transmitted to the remote device(s) over a suitable network, such as a wireless cell network. In some implementations, the uploaded data includes the relevant data for one or more particular container handling events. For example, the operational sensor data and/or location data can be analyzed on the device 1112 to determine the presence of a triggering condition, and the particular image(s) (and/or video data) for the appropriate time period based on the triggering condition can be uploaded for analysis along with the corresponding time period of telemetry data, operational sensor data, and/or location data. In some instances, the data can be uploaded in real time with respect to the handling of the container, or the data can be uploaded in batches periodically. Data upload may be delayed until a suitable network connection is available between the onboard computing device 1112 and the remote device(s) 1126.

As used herein, a real time process or operation describes a process or operation that is performed in response to detecting a triggering condition (e.g., event), in which the real time process is performed without any unnecessary delay following the triggering condition, apart from the delay that is incurred due to the limitations (e.g., speed, bandwidth) of any networks being used, transfer of data between system components, memory access speed, processing speed, and/or computing resources. A real time process or operation may be performed within a short period of time following the detection of the triggering condition, and/or may be performed at least partly concurrently with the triggering condition. A triggering condition may be the receipt of a communication, the detection of a particular system state, and/or other types of events. In some instances, a real time process is performed within a same execution path, such as within a same process or thread, as the triggering condition. In some instances, a real time process is performed by a different process or thread that is created or requested by a process that detects the triggering condition. A real time process may also be described as synchronous with respect to the triggering condition.

Figure 14:
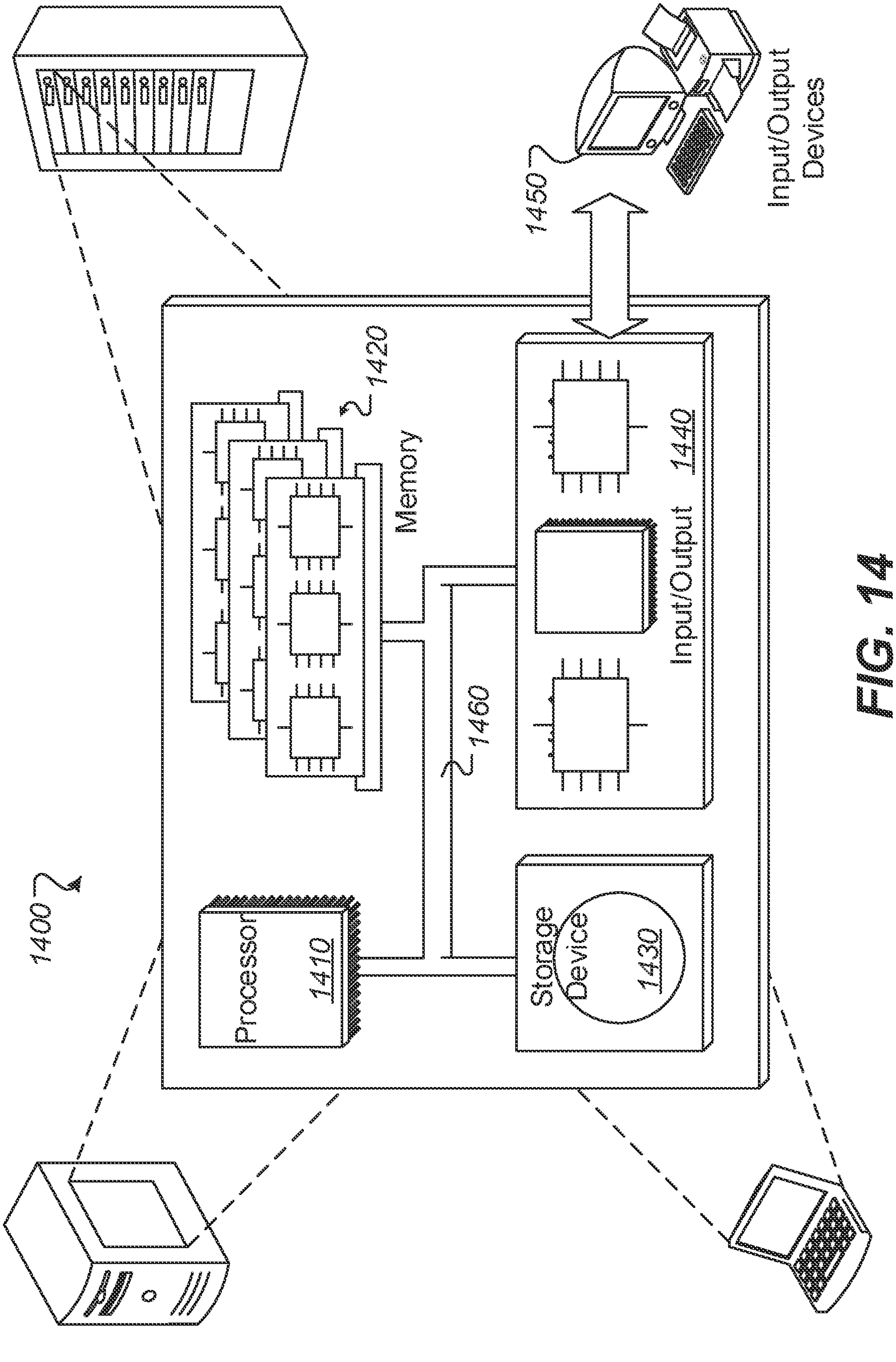
FIG. 14 depicts an example computing system, according to implementations of the present disclosure.

FIG. 14 depicts an example computing system, according to implementations of the present disclosure. The system 1400 may be used for any of the operations described with respect to the various implementations discussed herein. For example, the system 1400 may be included, at least in part, in one or more of the onboard computing device 1112, the analysis computing device(s) 1120, the output device(s) 1126, and/or other computing device(s) or system(s) described herein. The system 1400 may include one or more processors 1410, a memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

The processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

The memory 1420 may store information within the system 1400. In some implementations, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In some examples, the memory 1420 may be employed as active or physical memory by one or more executing software modules.

The storage device(s) 1430 may be configured to provide (e.g., persistent) mass storage for the system 1400. In some implementations, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1500. In some implementations, the CRSM may include a data store that provides storage of computer-readable instructions or other information in a non-transitory format. The CRSM may be incorporated into the system 1400 or may be external with respect to the system 1500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1410 and the memory 1420 may be supplemented by, or incorporated into, one or more application-specific integrated circuits (ASICs). The system 1400 may include one or more I/O devices 1450.

The system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-232 standard for serial ports, or with a version of the IEEE 1284 standard for parallel ports. As another example, the I/O interface(s) 1440 may be configured to provide a connection over Universal Serial Bus (USB) or Ethernet. In some examples, the I/O interface(s) 1440 may be configured to provide a serial connection that is compliant with a version of the IEEE 1394 standard.

Computing devices of the system 1400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

As used herein, a "packer" includes any device, mechanism, or system that packs or compacts material in a compartment or ejects material from a compartment.

As used herein, an "ejector" includes any component or combination of components that can be used to push material to compact the material or eject the material from a compartment or vessel. As one example, an ejector may be a metal plate that collects and moves refuse as the ejector is pushed along the floor of a storage compartment.

As used herein, a "driver" includes any device, mechanism, or system that imparts force to mechanically drive one or more components. Examples of a driver include an electric motor, a hydraulic motor, or an engine. A driver may also include gearboxes, belts, chain drives, or any other power transmission devices.

As used herein, a "receptacle" means any component or combination of components that receives or holds at least part of another component, device, or assembly.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A refuse collection vehicle, comprising:

a body comprising a storage compartment, the storage compartment comprising a floor;

a packer system coupled to the body, the packer system comprising:

an ejector;

two or more helical band actuators coupled to the ejector, each of at least two of the helical band actuators comprising:

a drive cylinder base;

a helical band drive cylinder coupled to the drive cylinder base; and a drive cylinder receptacle coupled between the helical band drive cylinder and the ejector;

a driver commonly coupled to the at least two of the two or more helical band actuators and operable to extend and retract the helical band drive cylinders; and one or more cross members coupled between the drive cylinder receptacles of the at least two of the helical band actuators, wherein the helical band actuators are operable to advance the ejector such that refuse is compacted in the storage compartment or ejected from the storage compartment, wherein the one or more cross members are configured to maintain a spacing between the drive cylinder receptacles, and wherein at least one of the one or more cross members is configured to maintain a squareness of the helical band actuators with respect to a common base.

2. The refuse collection vehicle of claim 1, wherein the storage compartment comprises one or more guide tracks, wherein the helical band actuators are operable to advance the ejector on the one or more guide tracks such that refuse is compacted in the storage compartment or ejected from the storage compartment.

3. The refuse collection vehicle of claim 1, wherein the drive cylinder bases of the at least two of the helical band actuators and the driver are coupled to a common base.

4. The refuse collection vehicle of claim 1, wherein the driver comprises an electric motor.

5. The refuse collection vehicle of claim 1, wherein the driver comprises a hydraulic motor.

6. The refuse collection vehicle of claim 1, wherein the driver comprises a chain drive.

7. The refuse collection vehicle of claim 1, wherein at least one of the drive cylinder receptacles comprises an end plate of a helical band actuator.

8. The refuse collection vehicle of claim 1, wherein the packer system further comprises a base plate coupled to the body, wherein the base plate is configured to support the driver and the drive cylinder bases of the at least two of the helical band actuators.

9. The refuse collection vehicle of claim 1, further comprising a control system configured to control a speed of at least two of the helical band actuators.

10. The refuse collection vehicle of claim 9, further comprising one or more sensors coupled to the control system, wherein at least one of the sensors is configured to sense a load of the ejector on at least one of the helical band actuators.

11. The refuse collection vehicle of claim 9, further comprising one or more sensors coupled to the control system, wherein the control system is configured to determine an angle of at least one of the helical band drive cylinders relative to one or more components of the packer system.

12. The refuse collection vehicle of claim 1, wherein the helical band actuators are configured to retract the ejector from the storage compartment.

13. A refuse collection vehicle, comprising:

a body comprising a storage compartment, the storage compartment comprising a floor;

a packer system coupled to the body, the packer system comprising:

an ejector;

two or more helical band actuators coupled to the ejector, each of at least two of the helical band actuators comprising:

a drive cylinder base;

a helical band drive cylinder coupled to the drive cylinder base; and a drive cylinder receptacle coupled between the helical band drive cylinder and the ejector; and a driver commonly coupled to the at least two of the two or more helical band actuators and operable to extend and retract the helical band drive cylinders, wherein the helical band actuators are operable to advance the ejector such that refuse is compacted in the storage compartment or ejected from the storage compartment, wherein the packer system further comprises a base plate coupled to the body, wherein the base plate is configured to support the driver and the drive cylinder bases of the at least two of the helical band actuators, and wherein the base plate is configured to pivot with respect to the body.

14. The refuse collection vehicle of claim 13, further comprising one or more cross members coupled between the drive cylinder receptacles of the at least two of the helical band actuators.

15. A method of compacting or ejecting refuse from a storage compartment, comprising:

coupling two or more helical band actuators to a common driver;

coupling the two or more helical band actuators to an ejector; and coupling one or more cross members between drive cylinder receptacles of at least two of the helical band actuators such that spacing is maintained between the drive cylinder receptacles and such that squareness of the helical band actuators with respect to a common base is maintained;

operating the common driver to advance the ejector in the storage compartment to compact refuse in the storage compartment or eject refuse from the storage compartment.

16. The method of compacting or ejecting refuse of claim 15, wherein the driver comprises an electric motor.

17. The method of compacting or ejecting refuse of claim 15, wherein the driver comprises a hydraulic motor.

18. The method of compacting or ejecting refuse of claim 15, wherein the driver comprises a chain drive.

* * * * *